(12) United States Patent
Kuroda et al.

(10) Patent No.: US 8,223,238 B2
(45) Date of Patent: Jul. 17, 2012

(54) SOLID-STATE IMAGING APPARATUS, AND IMAGING SYSTEM USING THE SAME

(75) Inventors: Yukihiro Kuroda, Kunitachi (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 12/623,726

(22) Filed: Nov. 23, 2009

(65) Prior Publication Data

US 2010/0134664 A1 Jun. 3, 2010

(30) Foreign Application Priority Data

Dec. 1, 2008 (JP) ................................ 2008-306738

(51) Int. Cl.
*H04N 3/14* (2006.01)
*H04N 5/335* (2011.01)

(52) U.S. Cl. ....................... 348/308; 348/280
(58) Field of Classification Search .................. None
See application file for complete search history.

(56) References Cited

U.S. PATENT DOCUMENTS

| | | | |
|---|---|---|---|
| 6,352,869 B1 * | 3/2002 | Guidash | 438/16 |
| 6,657,665 B1 * | 12/2003 | Guidash | 348/308 |
| 6,973,265 B2 | 12/2005 | Takahashi | 396/121 |
| 7,561,199 B2 | 7/2009 | Noda et al. | 348/308 |
| 2005/0117039 A1 | 6/2005 | Tatani | 348/272 |
| 2005/0128327 A1 * | 6/2005 | Bencuya et al. | 348/308 |
| 2006/0038904 A1 * | 2/2006 | Kudoh | 348/308 |
| 2006/0043440 A1 * | 3/2006 | Hiyama et al. | 257/291 |
| 2006/0238633 A1 | 10/2006 | Kinugasa et al. | 348/300 |
| 2007/0023798 A1 * | 2/2007 | McKee | 257/291 |
| 2007/0164335 A1 * | 7/2007 | McKee | 257/294 |
| 2007/0215912 A1 * | 9/2007 | Kido et al. | 257/257 |
| 2008/0029787 A1 | 2/2008 | Watanabe et al. | 257/233 |
| 2008/0029793 A1 | 2/2008 | Watanabe et al. | 257/291 |
| 2008/0036890 A1 | 2/2008 | Yamashita et al. | 348/308 |
| 2008/0088724 A1 * | 4/2008 | Kudoh | 348/300 |
| 2008/0303930 A1 | 12/2008 | Kuroda et al. | 348/308 |
| 2009/0008684 A1 | 1/2009 | Kuroda | 257/292 |
| 2009/0015699 A1 | 1/2009 | Watanabe et al. | 348/308 |
| 2009/0122172 A1 | 5/2009 | Iwata et al. | 348/302 |
| 2009/0167914 A1 | 7/2009 | Itano et al. | 348/301 |
| 2009/0200449 A1 | 8/2009 | Iwata et al. | 250/206 |
| 2009/0212336 A1 | 8/2009 | Iwata et al. | 257/292 |
| 2009/0219420 A1 | 9/2009 | Kuroda | 348/281 |

FOREIGN PATENT DOCUMENTS

JP 2005-110104 A 4/2005
JP 2006-073733 A 3/2006

* cited by examiner

*Primary Examiner* — Nelson D. Hernández Hernández
*Assistant Examiner* — Dennis Hogue
(74) *Attorney, Agent, or Firm* — Fitzpatrick, Cella, Harper & Scinto

(57) ABSTRACT

A solid-state imaging apparatus which can photograph a high-definition image and, at high quality, a moving image having lower resolution than that of the high-definition image is provided. The solid-state imaging apparatus comprises: plural pixels which include a photoelectric conversion unit and a transfer unit; an impurity diffused region which accumulates charges transferred from the photoelectric conversion unit through the transfer unit; an amplifying unit which outputs signals based on the charges accumulated by the impurity diffused region; and a reset unit which resets potential of the impurity diffused region, wherein the four pixels including the obliquely adjacent two pixels and the two pixels, in a same row or column, adjacent to one of the obliquely adjacent two pixels constitute a unit pixel group, and the impurity diffused region, the amplifying unit and the reset unit are commonly connected to the four pixels constituting the unit pixel group.

21 Claims, 9 Drawing Sheets

SOLID-STATE IMAGING APPARATUS, AND IMAGING SYSTEM USING THE SAME

BACKGROUND OF THE INVENTION

1. Field of the Invention

The present invention relates to a solid-state imaging apparatus and an imaging system which uses the solid-state imaging apparatus.

2. Description of the Related Art

Recently, a solid-state imaging apparatus corresponding to an image of 10,000,000 pixels has been used for a digital still camera. This is a result of pursuing an image quality which can be usually obtained by a silver salt camera (i.e., a film-based camera), and the solid-state imaging apparatus of this type is mainly used exclusively for a still image. On the other hand, it should be noted that the number of pixels necessary to obtain a moving image of which the quality substantially corresponds to that of a full high definition television system is 2,000,000 pixels or so.

If the solid-state imaging apparatus corresponding to the image of 10,000,000 pixels is used in regard to a moving image, a reading speed as much as about five times the reading speed in a case where a solid-state imaging apparatus corresponding to an image of 2,000,000 pixels is used to obtain the moving image is necessary. In this case, following problems occurred. That is, since electric power consumption highly increases, noises caused by such increase of the electric power consumption has an adverse affect on an image quality. In addition, since a memory capacity to be used for an image processing increases, manufacturing costs of the apparatus increase.

Thus, in order to increase the reading speed and reduce the electric power consumption, there is a method of adding and reading signal charges. More specifically, Japanese Patent Application Laid-Open No. 2006-073733 discloses a solid-state imaging apparatus which can perform same color addition in a unit pixel group in regard to each color by using the unit pixel group constituted by a common amplifier having four rows and one column.

However, in such an addition method as described in Japanese Patent Application Laid-Open No. 2006-073733, the addition in the unit pixel group can be performed only in the vertical direction. That is, in this method, the addition of the pixels adjacent in an oblique direction cannot be performed. That is, if the addition of the adjacent pixels is performed only in the vertical direction, image information of each color after the addition was performed comes not to have spatially equal intervals. Thus, there is a problem that resolution deteriorates. For this reason, it is required to add pixels signals respectively indicating the pixels arranged in the oblique direction. In this connection, it is necessary to provide an addition unit to add the pixels adjacent in the oblique direction. More specifically, it is necessary to add a line memory or the like. At this time, a process of writing the signals of the pixels adjacent in the oblique direction in the line memory respectively and then performing the addition to the written signals has to be performed. This process prevents from improving a frame rate.

The present invention aims to solve the conventional problems as described above. Moreover, the present invention aims to provide a solid-state imaging apparatus which can photograph a high-definition image and also can photograph at high quality a moving image of which the resolution is lower than that of the high-definition image, and to provide an imaging system which uses the solid-state imaging apparatus.

SUMMARY OF THE INVENTION

A solid-state imaging apparatus according to the present invention is characterized by comprising: plural pixels which include a photoelectric conversion unit for photoelectrically converting incident light into charges corresponding to an amount of the incident light and then accumulating the converted charges and a transfer unit for transferring the charges photoelectrically converted by the photoelectric conversion unit, and are arranged two-dimensionally; an impurity diffused region which accumulates the charges transferred from the photoelectric conversion unit through the transfer unit; an amplifying unit which outputs signals on the basis of the charges accumulated by the impurity diffused region; and a reset unit which resets potential of the impurity diffused region, and the solid-state imaging apparatus is further characterized in that the four pixels which include the two pixels adjacent in an oblique direction and the two pixels, in a same row or a same column, adjacent to one of the two pixels adjacent in the oblique direction constitute a unit pixel group, and the impurity diffused region, the amplifying unit and the reset unit are commonly connected to the four pixels which constitute the unit pixel group.

Moreover, an imaging system according to the present invention is characterized by comprising: the above-described solid-state imaging apparatus; an optical system which performs image formation of light to the above-described solid-state imaging apparatus; and a signal processing circuit which processes an output signal output from the above-described solid-state imaging apparatus.

Other features and advantages of the present invention will be apparent from the following description when taken in conjunction with the accompanying drawings, in which like reference characters designate the same or similar parts throughout the figures thereof.

The accompanying drawings, which are incorporated in and constitute a part of the specification, illustrate the exemplary embodiments of the present invention and, together with the description of the specification, serve to explain the principles of the present invention.

DESCRIPTION OF THE EMBODIMENTS

Hereinafter, the exemplary embodiments of the present invention will be described with reference to the attached drawings.

Figure 1:
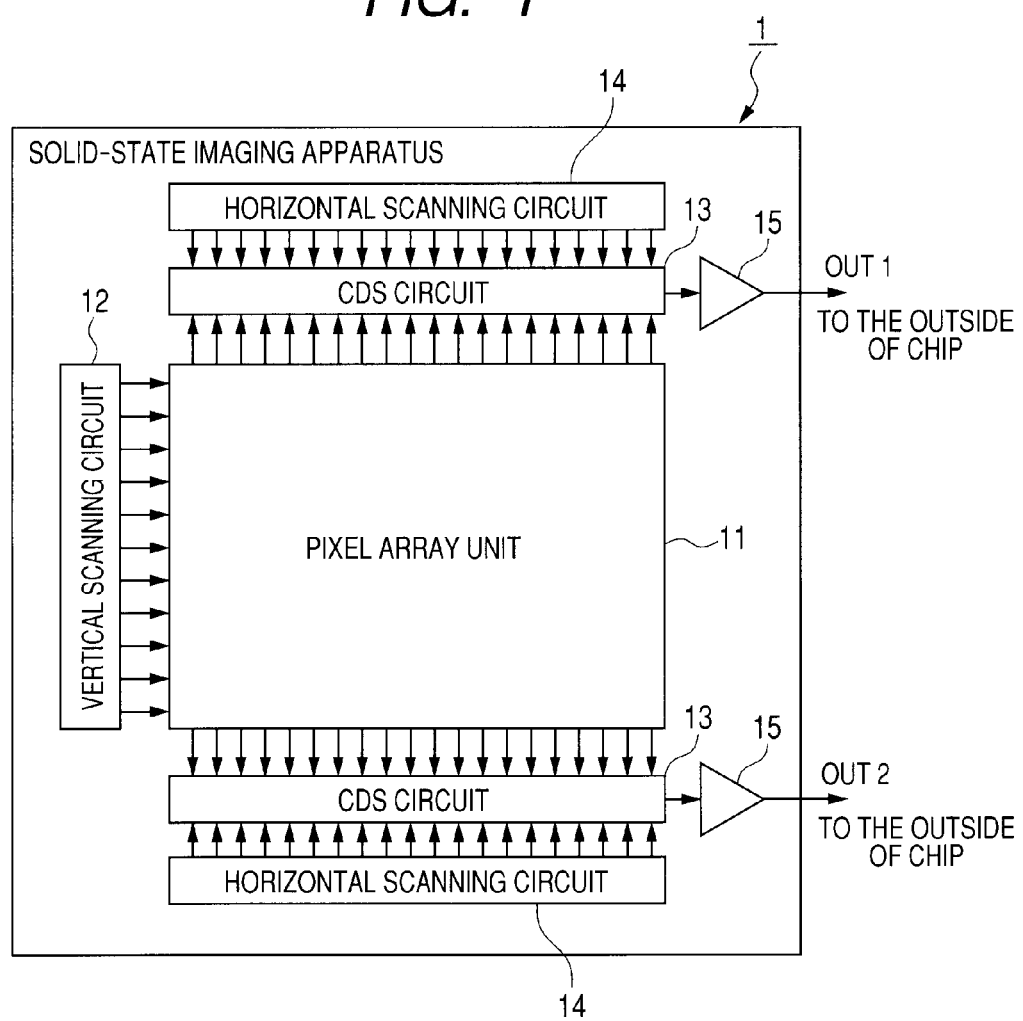
FIG. 1 is a block diagram illustrating a schematic constitution of a solid-state imaging apparatus according to an embodiment of the present invention.

FIG. 1 is a diagram illustrating a schematic constitution of a solid-state imaging apparatus according to an embodiment of the present invention. Here, it should be noted that the solid-state imaging apparatus in the present embodiment is also called an amplifying-type solid-state imaging apparatus or a CMOS (complementary metal-oxide semiconductor) image sensor. In any case, FIG. 1 illustrates that a solid-state imaging apparatus 1 comprises a pixel array unit 11, a vertical scanning circuit 12, CDS (correlated double sampling) circuits 13, horizontal scanning circuits 14 and output amplifiers 15.

The pixel array unit 11 includes plural unit pixel groups arranged two dimensionally, and each of the plural unit pixel groups includes plural pixels. Further, the pixel array unit 11 includes not-illustrated color filters arranged two dimensionally. The color filters of the respective pixels are arranged like a checkered pattern. More specifically, the color filters are arranged in the form of a Bayer arrangement in which G (green) filters are arranged at half of all the checkers constituting the checkered pattern and R (red) filters and B (blue) filters are arranged respectively at halves of the remaining checkers constituting the checkered pattern. In the following, the pixel in which the G filter is arranged will be called a G pixel, the pixel in which the R filter is arranged will be called an R pixel, and the pixel in which the B filter is arranged will be called a B pixel.

Each of the CDS circuits 13 includes plural unit CDS circuits each of which is arranged for one pixel column or plural pixel columns of the pixel array unit 11 and performs a CDS process to signals read from the pixels in the row selected by the vertical scanning circuit 12 through a signal output line. More specifically, the CDS circuit 13 outputs a difference between a reset level and a signal level from each pixel or a difference between a reset level including an inherent offset of a channel through which the signal is read and a signal level. Thus, a fixed pattern noise, a reset noise and the like which are caused due to a variation of each pixel or the like are eliminated. Incidentally, it should be noted that the difference between the reset level and the signal level may be output by the output amplifier 15 or may be output outside the solid-state imaging apparatus 1.

After the CDS circuit 13 performed the CDS process, the corresponding horizontal scanning circuit 14 selects the signals stored with respect to each column in order. Then, the corresponding output amplifier 15 amplifies the signals of the column selected by the horizontal scanning circuit 14 and then outputs the amplified signals.

The above-described constitution is merely an example constitution of the solid-state imaging apparatus. That is, the present embodiment is not limited to this. For example, a single output system including the CDS circuit 13, the output amplifier 15 and the like may be provided. Otherwise, three or more output systems each including the CDS circuit 13, the output amplifier 15 and the like may be provided.

Figure 2:
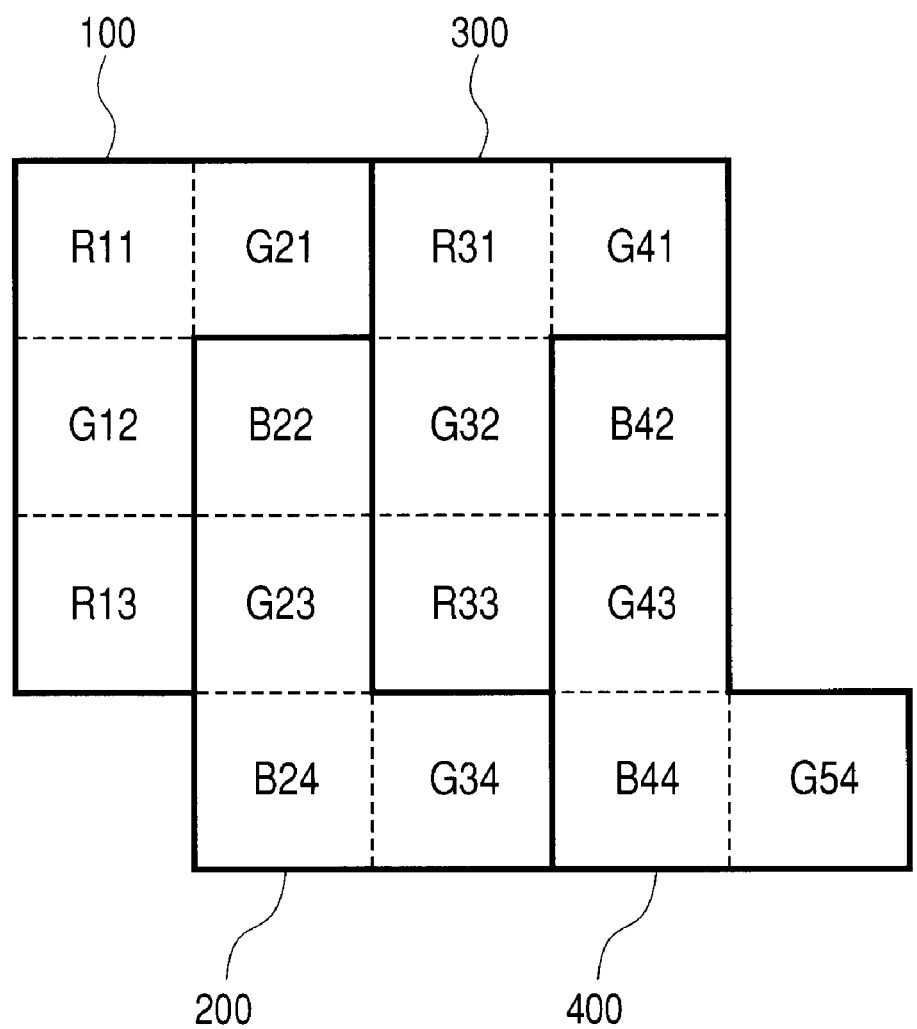
FIG. 2 is a plan view illustrating a relation between unit pixel groups and a color filter arrangement.

FIG. 2 is a plan view for describing a relation between unit pixel groups and a color filter arrangement. That is, FIG. 2 illustrates a case where four unit pixel groups 100, 200, 300 and 400 are arranged respectively. Here, in the unit pixel groups 100 to 400 illustrated in FIG. 2, "R" indicates the R pixels, "G" indicates the G pixels, and "B" indicates the B pixels.

The unit pixel group 100 is composed of four pixels including two obliquely adjacent G pixels G12 and G21 and two R pixels R11 and R13 respectively adjacent to the G pixel G12. The unit pixel group 200 is composed of four pixels including two obliquely adjacent G pixels G23 and G34 and two B pixels B22 and B24 respectively adjacent to the G pixel G23. Likewise, the unit pixel group 300 is composed of four pixels including two obliquely adjacent G pixels G32 and G41 and two R pixels R31 and R33 respectively adjacent to the G pixel G32, and the unit pixel group 400 is composed of four pixels including two obliquely adjacent G pixels G43 and G54 and two B pixels B42 and B44 respectively adjacent to the G pixel G43.

Figure 3:
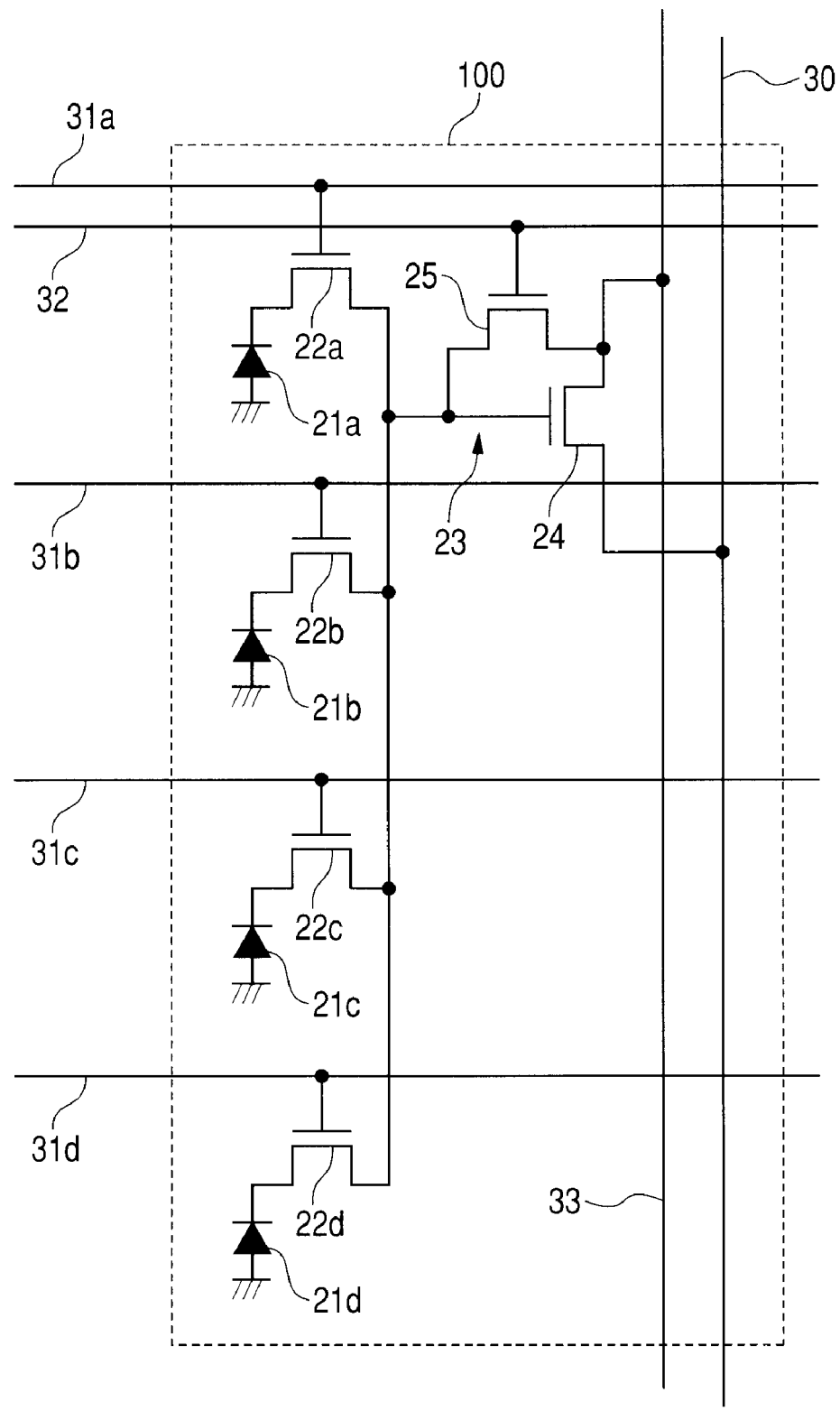
FIG. 3 is a circuit diagram illustrating an example of the constitution of the unit pixel group.

FIG. 3 is a circuit diagram illustrating an equivalent circuit of the unit pixel group. For example, the unit pixel group 100 includes, as circuit components, plural photoelectric conversion units 21a to 21d, plural transfer registers 22a to 22d, a single impurity diffused region 23, a single amplifying transistor 24 and a single reset transistor 25. In the following, the impurity diffused region 23 is also called an FD (floating diffusion) 23.

Further, the unit pixel group 100 includes a signal output line 30 described as above, a transfer control lines 31a to 31d, a reset signal line 32 and a power supply line 33. Here, the signal output line 30 is typically shared by the plural unit pixel groups which are arranged in the same column direction, and the reset signal line 32 is typically shared by the plural unit pixel groups which are arranged in the row direction.

In the present embodiment, the respective drains of the plural transfer transistors 22a to 22d are mutually connected, whereby the FD 23 which acts as the single node is formed. Thus, it is possible to enlarge the areas of the photoelectric conversion units 21a to 21d for each pixel, whereby it is thus possible to increase an aperture ratio (a ratio of the aperture areas of the photoelectric conversion units 21a to 21d to the area of one pixel).

The photoelectric conversion units 21a to 21d of which the anodes are respectively grounded photoelectrically convert incident light into charges corresponding to the amount of incident light and then accumulate the converted charges. The transfer transistors 22a to 22d act as a transfer unit for transferring the signal charges generated by the corresponding photoelectric conversion units 21a to 21d respectively to the FD 23. More specifically, the respective sources of the transfer transistors 22a to 22d are connected to the respective cathodes of the corresponding photoelectric conversion units 21a to 21d, the respective gates of the transfer transistors 22a to 22d are connected respectively to the corresponding transfer control lines 31a to 31d, and the respective drains of the transfer transistors 22a to 22d are together connected to the FD 23 and the gate of the amplifying transistor 24.

The transfer transistors (i.e., the transfer unit) 22a to 22d, which are respectively arranged between the corresponding photoelectric conversion units 21a to 21d and the gate electrode of the single amplifying transistor 24, transfer the charges photoelectrically converted by the respective photoelectric conversion units 21a to 21d. If the potential of the transfer control lines 31a to 31d becomes a high level, the transfer transistors 22a to 22d respectively transfer the charges accumulated in the respective photoelectric conversion units 21a to 21d to the FD 23. The FD 23 accumulates the signal charges which are transferred from one or the plural photoelectric conversion units selected from the plural photoelectric conversion units 21a to 21d through the corresponding transfer transistors 22a to 22d.

Here, if the charges respectively accumulated in the plural photoelectric conversion units 21a to 21d are simultaneously transferred to the FD 23, it is possible to perform the addition of the signal charges.

The gate of the amplifying transistor (i.e., an amplifying unit) 24 is connected to the FD 23, the drain thereof is connected to the power supply line 33, and the source thereof is connected to the signal output line 30. Thus, the amplifying transistor 24 outputs the signals to the signal output line 30 on the basis of the signal charges accumulated in the FD 23.

The source of the reset transistor (i.e., a reset unit) 25 is connected to the FD 23 and the gate of the amplifying transistor 24, the drain thereof is connected to the power supply line 33, and the gate thereof is connected to the reset signal line 32. Here, if the level of the reset signal line 32 becomes a high level, the reset transistor 25 resets the potential of the FD 23, that is, the gate potential of the amplifying transistor 24, to the potential of the power supply line 33. At the same time, if electrical continuity is provided for the transfer transistors 22a to 22d, it is possible to also reset the photoelectric conversion units 21a to 21d. There are at least two potentials for the power supply line 33. Therefore, if the potential of the FD 23 is set to two values, it is possible to output the signals to the reset signal line 32.

Figure 4:
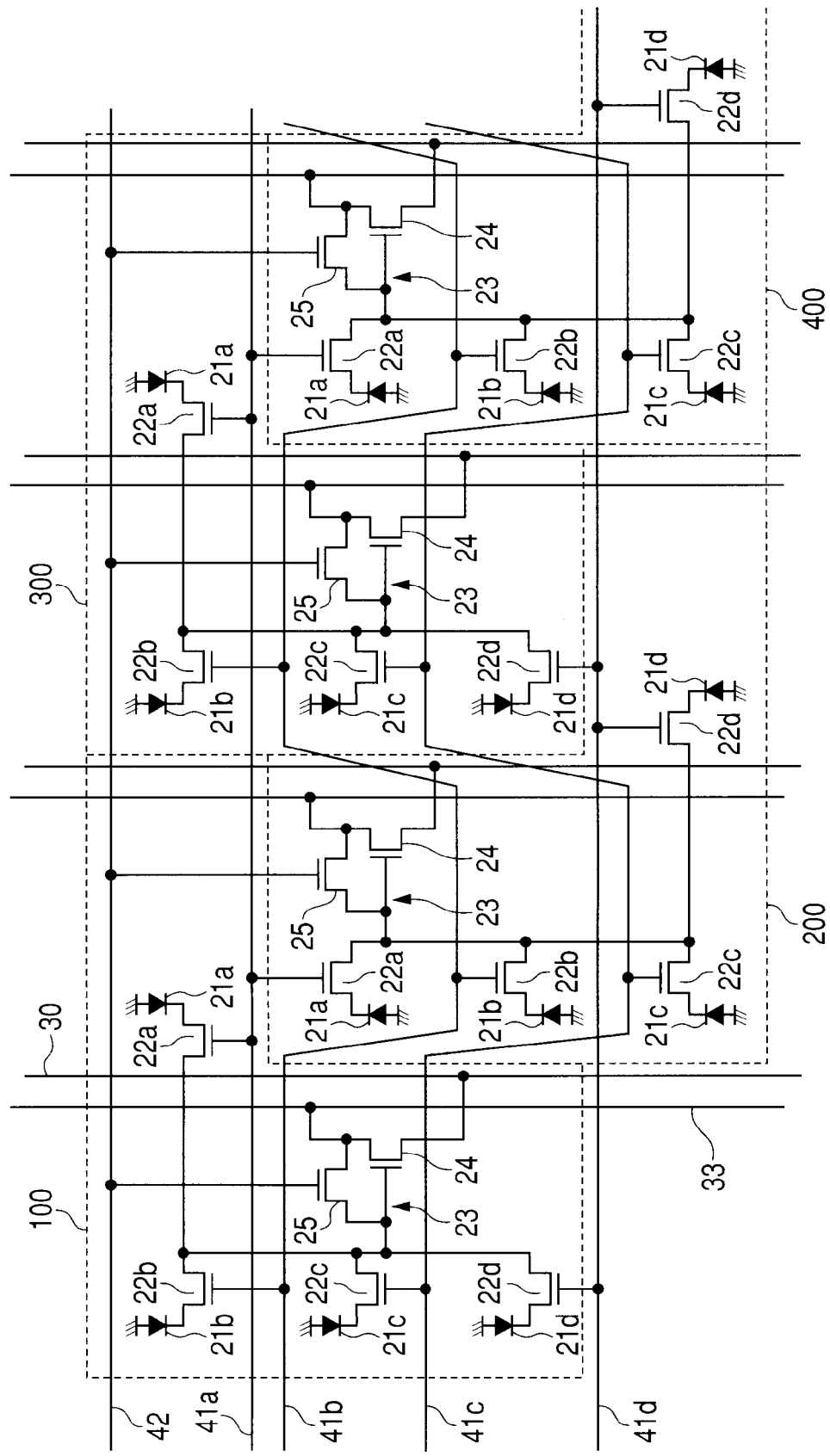
FIG. 4 is a circuit diagram illustrating a case where the plural unit pixel groups are arranged.

FIG. 4 is a circuit diagram illustrating a case where the plural unit pixel groups each illustrated in FIG. 3 are arranged. In FIG. 4, the arrangement of the unit pixel groups 100 to 400 is the same as that in the case illustrated in FIG. 2. That is, in the unit pixel group 100, the pixel composed by the photoelectric conversion unit 21a and the transfer transistor 22a is equivalent to the G pixel G21 illustrated in FIG. 2. Further, the pixel composed by the photoelectric conversion unit 21b and the transfer transistor 22b is equivalent to the R pixel R11 illustrated in FIG. 2, the pixel composed by the photoelectric conversion unit 21c and the transfer transistor 22c is equivalent to the G pixel G12 illustrated in FIG. 2, and the pixel composed by the photoelectric conversion unit 21d and the transfer transistor 22d is equivalent to the R pixel R13 illustrated in FIG. 2. Likewise, in the unit pixel group 200, the pixel composed by the photoelectric conversion unit 21a and the transfer transistor 22a is equivalent to the B pixel B22 illustrated in FIG. 2, the pixel composed by the photoelectric conversion unit 21b and the transfer transistor 22b is equivalent to the G pixel G23 illustrated in FIG. 2, the pixel composed by the photoelectric conversion unit 21c and the transfer transistor 22c is equivalent to the B pixel B24 illustrated in FIG. 2, and the pixel composed by the photoelectric conversion unit 21d and the transfer transistor 22d is equivalent to the G pixel G34 illustrated in FIG. 2.

Moreover, in FIG. 4, a transfer control line 41a is commonly connected to the respective transfer transistors 22a of the unit pixel groups 100 to 400, a transfer control line 41b is commonly connected to the respective transfer transistors 22b of the unit pixel groups 100 to 400, a transfer control line 41c is commonly connected to the respective transfer transistors 22c of the unit pixel groups 100 to 400, and a transfer control line 41d is commonly connected to the respective transfer transistors 22d of the unit pixel groups 100 to 400. Furthermore, a reset signal line 42 is commonly connected to the respective reset transistors 25 of the unit pixel groups 100 to 400.

According to the above-described constitution, if the potential of the transfer control line 41a is set to a high level, the pixels G21, B22, G41 and B42 illustrated in FIG. 2 are read. Likewise, if the potential of the transfer control line 41b is set to a high level, the pixels R11, G23, R31 and G43 illustrated in FIG. 2 are read. Further, if the potential of the transfer control line 41c is set to a high level, the pixels G12, B24, G32 and B44 illustrated in FIG. 2 are read. Furthermore, if the potential of the transfer control line 41d is set to a high level, the pixels R13, G34, R33 and G54 illustrated in FIG. 2 are read. Therefore, if the potentials of the transfer control lines 41a and 41c are set to high levels at the same time, in the unit pixel groups 100 and 300, the additions of the two G pixels adjacent in the oblique direction are respectively performed by the FD 23, and, in the unit pixel groups 200 and 400, the additions of the two B pixels are respectively performed by the FD 23.

Moreover, if the potentials of the transfer control lines 41b and 41d are set to high levels at the same time, in the unit pixel groups 100 and 300, the additions of the two R pixels are respectively performed by the FD 23, and, in the unit pixel groups 200 and 400, the additions of the two G pixels adjacent in the oblique direction are respectively performed by the FD 23.

According to the present embodiment, even if any addition unit such as a line memory or the like is not used, same color two-pixel addition for each color can be performed by the respective unit pixel groups 100 to 400. For this reason, since it is possible to reduce a chip area, it is possible to manufacture the solid-state imaging apparatus at low cost. Moreover, the addition processes by the unit pixel groups 100 to 400 are performed by setting the potentials of the plural transfer control lines 41a to 41d to the high level at the same time. As a result, since it is possible to reduce the number of times of reading the pixel signals as compared with a case where the addition unit such as the line memory or the like is used, it is possible to improve a frame rate.

Figure 5:
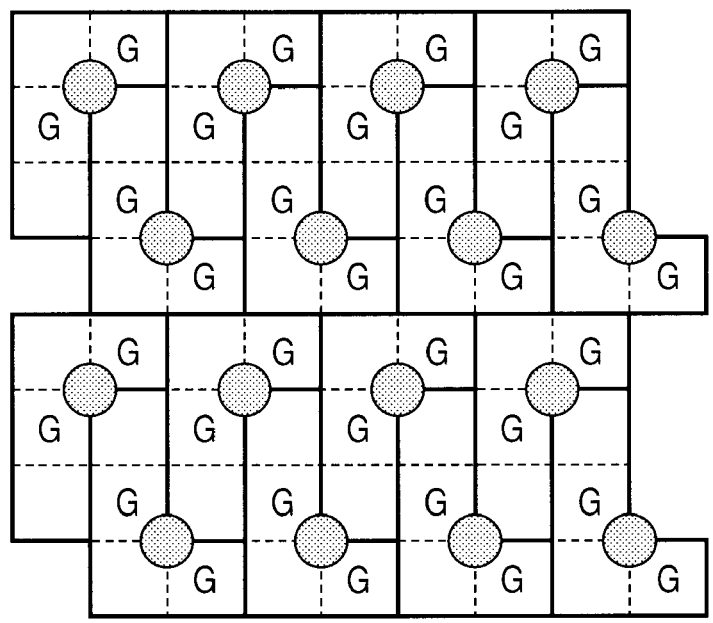
FIG. 5 is a diagram illustrating a spatial arrangement of image information by G pixels in an addition mode.
Figure 6:
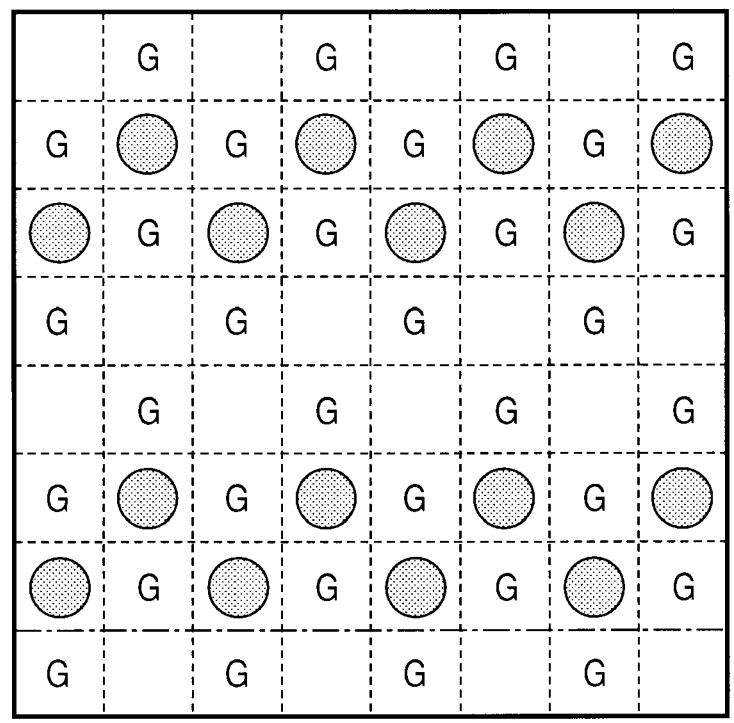
FIG. 6 is a diagram for describing the spatial arrangement of the image information concerning FIG. 5.

Here, FIG. 5 is a diagram illustrating a spatial arrangement of barycenters in a case where the G pixels are added to the unit pixel groups illustrated in FIG. 2. Further, FIG. 6 is a diagram for describing an arrangement of barycenters (black circles) in a conventional case where the G pixels are added in the unit pixel group. In the present embodiment, since the two G pixels which are adjacent in the oblique direction are added, as indicated by the black circles illustrated in FIG. 5, the G pixels are arranged at equal intervals respectively in the vertical direction, the horizontal direction and the oblique direction. As indicated by the black circles illustrated in FIG. 6, it is possible in the present embodiment to reduce spatial distances as compared with a conventional case where the two G pixels are added together in the vertical directions, whereby it is possible to obtain excellent image quality.

In the above-described embodiment, it is preferable that each of the transfer transistors 22a to 22d, the amplifying transistor 24 and the reset transistor 25 is constituted by an N-type MOS (metal-oxide semiconductor) transistor. However, the present invention is not limited to this. That is, each of the transfer transistors 22a to 22d, the amplifying transistor 24 and the reset transistor may be constituted by a P-type MOS transistor or constituted by properly combining the N-type MOS transistor and the P-type MOS transistor.

Figure 7:
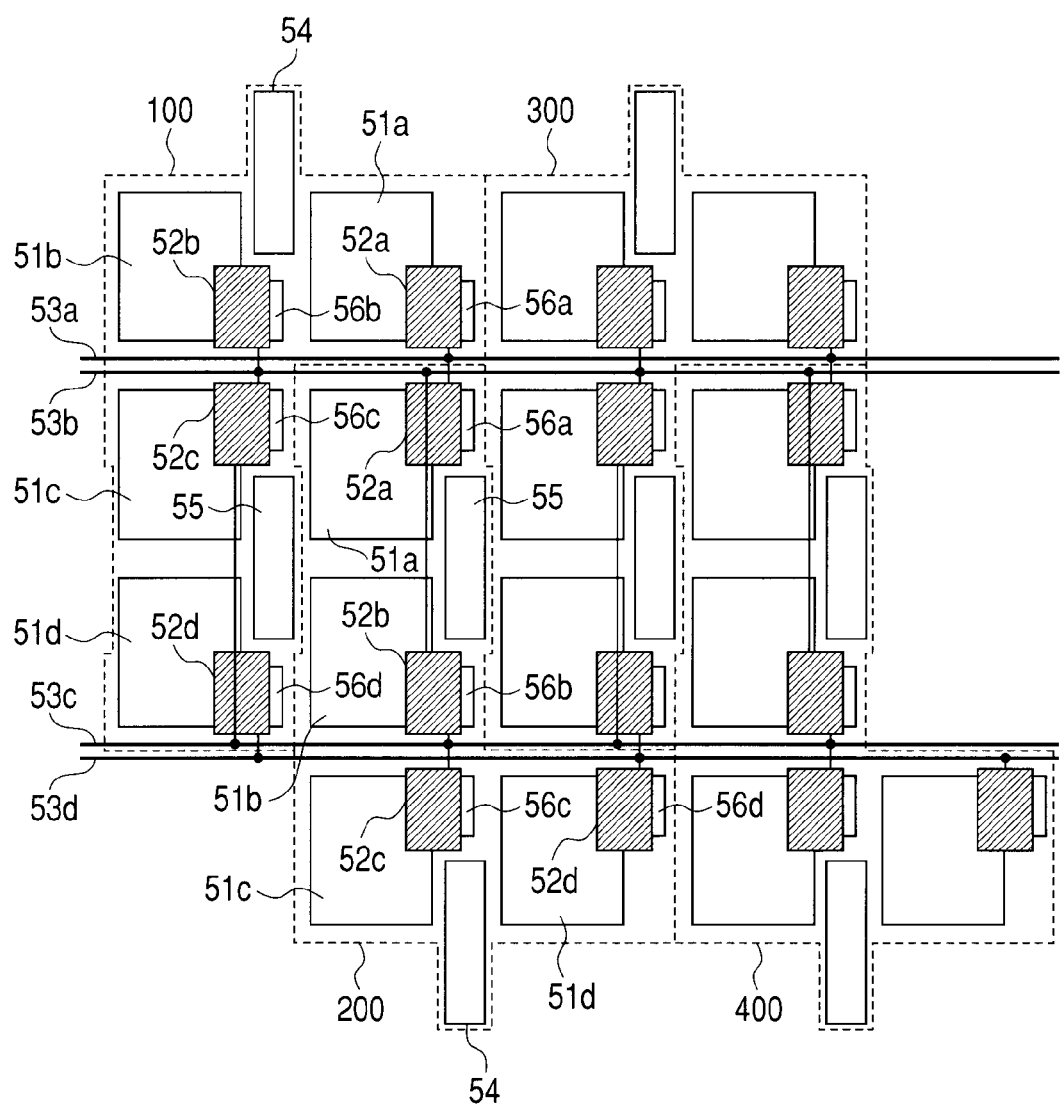
FIG. 7 is a schematic plane pattern diagram illustrating an example of the constitution of the unit pixel group.

FIG. 7 is a schematic plane pattern diagram illustrating an example of the constitution of the unit pixel groups 100 to 400 illustrated in FIG. 4. More specifically, the pattern illustrated in FIG. 7 includes photoelectric conversion units 51a to 51d, and the transfer transistors which respectively have gate electrodes 52a to 52d. Here, each of the gate electrodes 52a to 52d is constituted by, for example, polysilicon. Further, the pattern illustrated in FIG. 7 includes transfer control lines 53a to 53d which respectively correspond to the transfer control lines 41a to 41d illustrated in FIG. 4. Here, it should be noted that the connection relation of the respective gate electrodes 52a to 52d of the respective transfer transistors of the unit pixel groups 100 to 400 is equivalent to that illustrated in FIG. 4. The transfer control lines 53a to 53d are electrically connected respectively to the gate electrodes 52a to 52d through respective contacts (not illustrated). Further, the reset transistor 25 and the amplifying transistor 24 are provided in each of transistor regions 54 and 55. Furthermore, FDs 56a to 56d of the respective pixels are constituted so that the drains of the respective transfer transistors are connected commonly to the wiring through the contacts. Here, it should be noted that, instead of the wiring, an impurity diffused region may be used for such connection. That is, the FD may be constituted by the plural impurity diffused regions connected or constituted only by the single impurity diffused region. Further, for example, the wiring is made of aluminum, copper or polysilicon, and the contact is made of tungsten or the like. In the unit pixel group 100, the pixel including the photoelectric conversion unit 51a and the gate electrode 52a of the transfer transistor corresponds to the G pixel G21 illustrated in FIG. 2. Furthermore, the pixel including the photoelectric conversion unit 51b and the gate electrode 52b of the transfer transistor corresponds to the R pixel R11 illustrated in FIG. 2, the pixel including the photoelectric conversion unit 51c and the gate electrode 52c of the transfer transistor corresponds to the G pixel G12 illustrated in FIG. 2, and the pixel including the photoelectric conversion unit 51d and the gate electrode 52d of the transfer transistor corresponds to the R pixel R13 illustrated in FIG. 2. Likewise, in the unit pixel group 200, the pixel including the photoelectric conversion unit 51a and the gate electrode 52a of the transfer transistor corresponds to the B pixel B22 illustrated in FIG. 2. Furthermore, the pixel including the photoelectric conversion unit 51b and the gate electrode 52b of the transfer transistor corresponds to the G pixel G23 illustrated in FIG. 2, the pixel including the photoelectric conversion unit 51c and the gate electrode 52c of the transfer transistor corresponds to the B pixel B24 illustrated in FIG. 2, and the pixel including the photoelectric conversion unit 51d and the gate electrode 52d of the transfer transistor corresponds to the G pixel G34 illustrated in FIG. 2.

According to the above-described constitution, the two-pixel addition for the G pixels adjacent in the oblique direction and the same color two-pixel addition for the R pixels or the B pixels can be performed by the unit pixel groups 100 to 400 respectively. Therefore, even in case of reading a moving image by using the solid-state imaging apparatus capable of photographing a high-precision still image, high-speed driving is unnecessary, whereby it is possible to reduce electric power consumption. In addition, according to the effect in the present embodiment, it is possible to achieve both the photographing of the high-precision still image and the image quality of the moving image.

Figure 8:
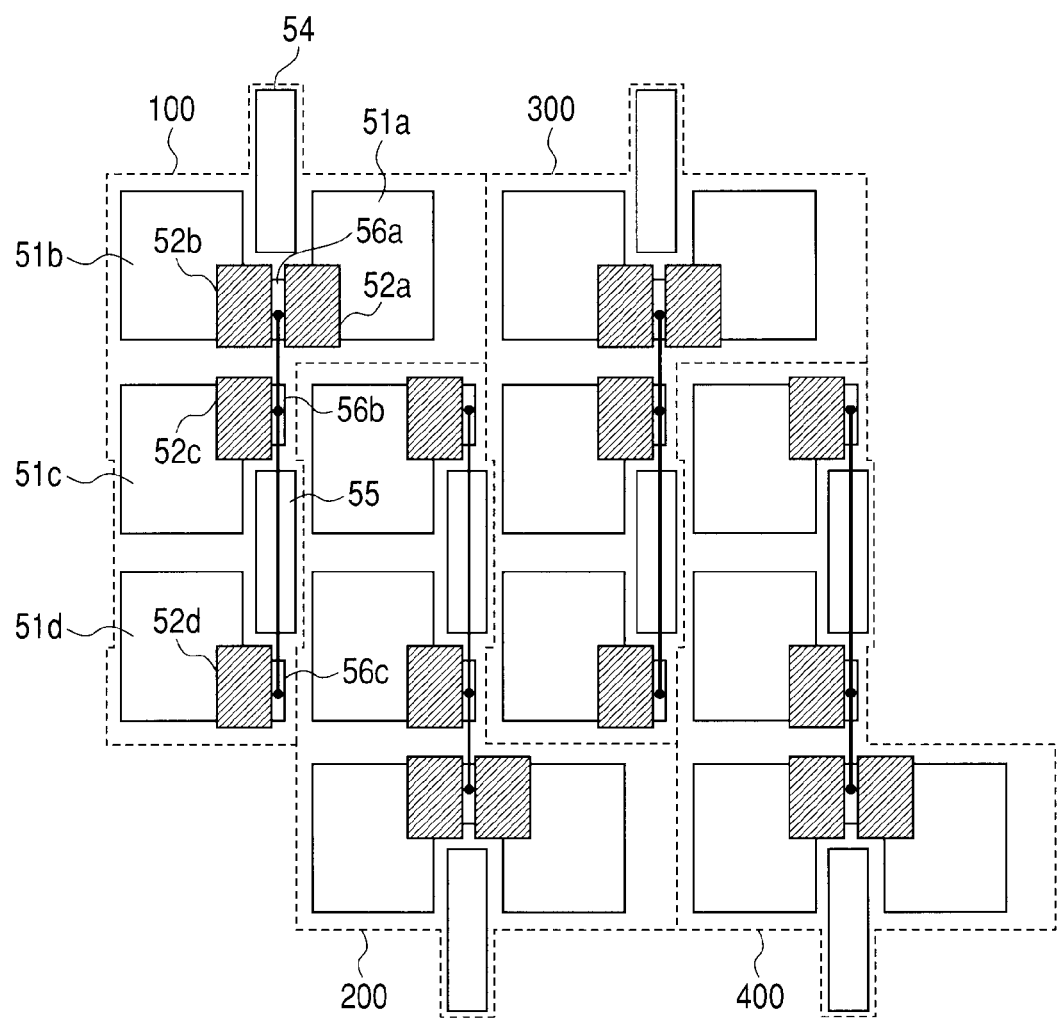
FIG. 8 is a schematic plane pattern diagram illustrating another example of the constitution of the unit pixel group.

FIG. 8 is a schematic plane pattern diagram illustrating another example of the constitution of the unit pixel groups 100 to 400 illustrated in FIG. 4. In FIG. 8, the respective reference numerals indicated are the same as those indicated in FIG. 7. Here, the FDs 56a to 56c are commonly connected together through the wiring and the contacts. However, these FDs may be commonly connected by using the impurity diffused region instead of the wiring.

In the present embodiment, the photoelectric conversion units 51a and 51b are arranged mirror symmetrically, and also the gate electrodes 52a and 52b of the transfer transistors are arranged mirror symmetrically. For these reasons, since it is possible to arrange the FDs 56a to 56c so as to be in alignment with others in the vertical direction, it becomes easy to commonly connect the FDs 56a to 56c. Consequently, degrees of freedom for laying out the wirings such as a signal output line (not illustrated), a power supply line (not illustrated) and the like increase. For this reason, since it is possible to reduce deterioration of light receiving efficiency due to the wirings and an influence of noises produced though parasitic capacitances, it is thus possible to obtain an excellent image. In the constitution illustrated in FIG. 8, it is possible to further achieve, in addition to the effects derived in the constitution illustrated in FIG. 7, improvement of sensitivity and reduction of noises.

Figure 9:
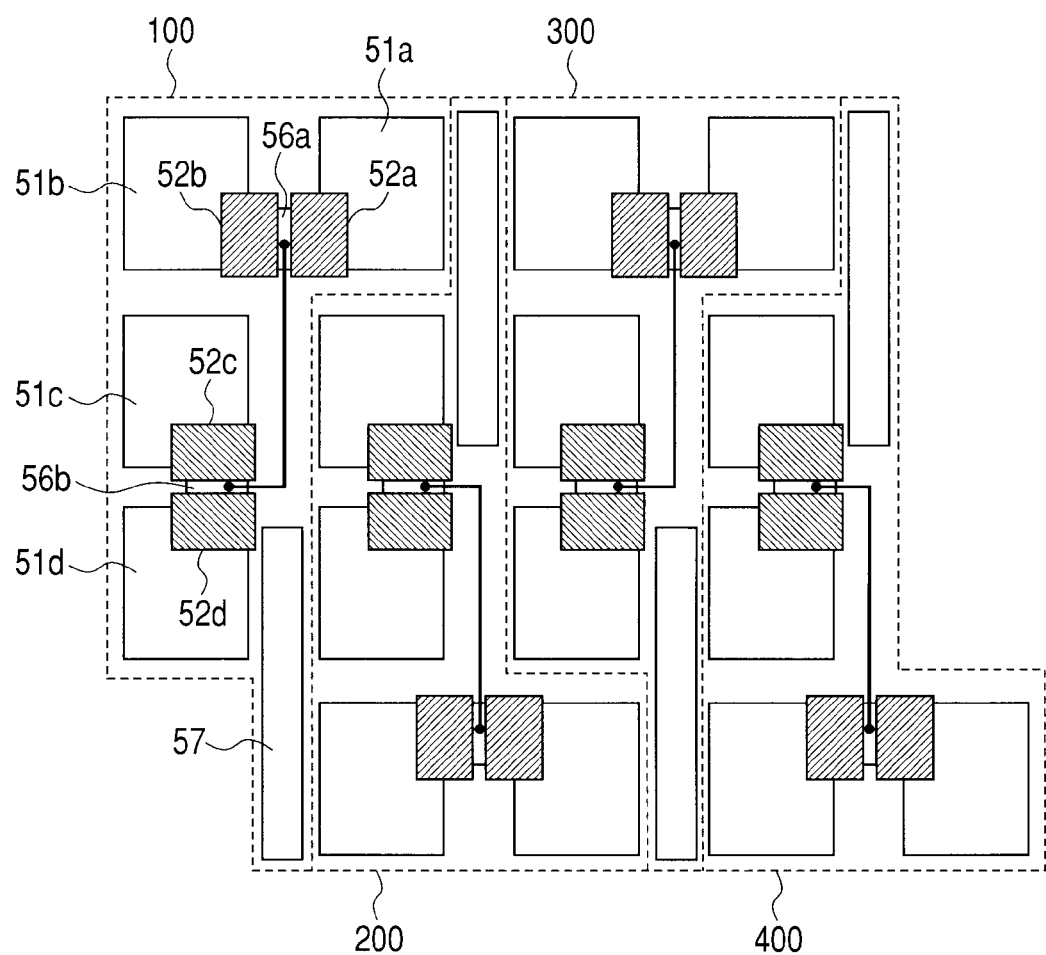
FIG. 9 is a schematic plane pattern diagram illustrating still another example of the constitution of the unit pixel group.

FIG. 9 is a schematic plane pattern diagram illustrating still another example of the constitution of the unit pixel groups 100 to 400 illustrated in FIG. 4. In FIG. 9, the respective reference numerals indicated are the same as those indicated in FIG. 7. Here, the reset transistor 25 and the amplifying transistor 24 (FIG. 3) are provided in a transistor region 57. Further, the FDs 56a and 56b are connected commonly to the wiring through the contacts. However, these FDs may be commonly connected by using an impurity diffused region instead of the wiring.

In the present embodiment, the photoelectric conversion units 51a and 51b are arranged mirror symmetrically, and also the gate electrodes 52a and 52b of the transfer transistors are arranged mirror symmetrically. Further, the photoelectric conversion units 51c and 51d are arranged mirror symmetrically, and also the gate electrodes 52c and 52d of the transfer transistors are arranged mirror symmetrically. For these reasons, it is possible to commonly connect the FDs 56a to 56b without the transistor region 57. Consequently, degrees of freedom for arranging the amplifying transistor 24 and the reset transistor 25 increase. Further, if the FDs 56a and 56b are connected by means of an activation region, degrees of freedom for laying out the wirings such as a signal output line (not illustrated), a power supply line (not illustrated) and the like increase. For this reason, since it is possible to reduce deterioration of light receiving efficiency due to the wirings and an influence of noises produced though parasitic capacitances, it is thus possible to obtain an excellent image. In any case, in the constitution illustrated in FIG. 9, the distance which is necessary to connect the FDs 56a and 56b together is shorter than that in the constitution illustrated in FIG. 8. For this reason, it is possible to further achieve improvement of sensitivity and reduction of noises as compared with the constitution illustrated in FIG. 8.

Figure 10:
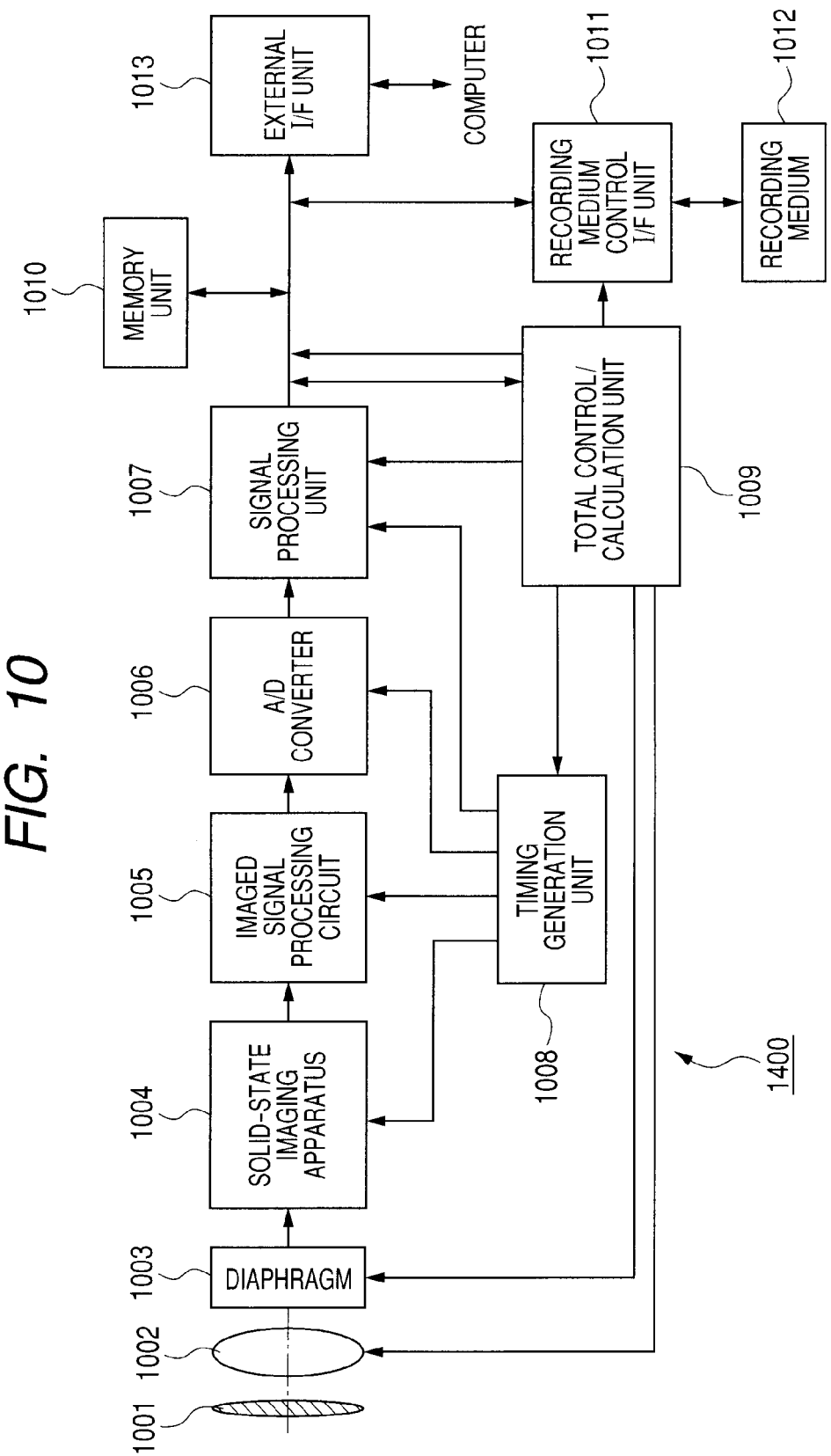
FIG. 10 is a block diagram illustrating a schematic constitution of an imaging system according to the embodiment of the present invention.

FIG. 10 is a block diagram illustrating a schematic constitution of an imaging system according to the embodiment of the present invention. In FIG. 10, an imaging system 1400 includes a solid-state imaging apparatus 1004 which is represented by the above-described solid-state imaging apparatus 1. In this system, an optical image of a photographic subject is imaged on an imaging surface of the solid-state imaging apparatus 1004 by means of a lens (i.e., an optical system) 1002. Here, a barrier 1001 which functions to protect the lens 1002 and also acts as a main switch can be provided outside the lens 1002. Further, a diaphragm 1003 which is used to adjust an amount of light output through the lens 1002 is provided to the lens 1002. Then, imaged signals which are output from the solid-state imaging apparatus 1004 through plural channels are subjected to various correction processes, a clamping process and the like by an imaged signal processing circuit 1005. Then, the imaged signals which are output from the imaged signal processing circuit 1005 through plural channels are subjected to an A/D (analog-to-digital) conversion process by an A/D converter 1006, and image data which is output from the A/D converter 1006 is further subjected to various correction processes, a data compression process and the like by a signal processing unit 1007. Here, it should be noted that the solid-state imaging apparatus 1004, the imaged signal processing circuit 1005, the A/D converter 1006 and the signal processing unit 1007 respectively operate in accordance with a timing signal generated by a timing generation unit 1008.

The blocks of the imaged signal processing circuit 1005, the A/D converter 1006, the signal processing unit 1007 and the timing generation unit 1008 may be formed on the same chip as that on which the solid-state imaging apparatus 1004 is formed. The respective blocks which are included in the imaging system 1400 are controlled by a total control/calculation unit 1009. In addition, the imaging system 1400 is constituted by comprising a memory unit 1010 which temporarily stores therein the image data, and a recording medium control I/F (interface) unit 1011 which records and reads the image data to and from a recording medium 1012. Here, the recording medium 1012, which is constituted by comprising a semiconductor memory and the like, is detachably provided. Incidentally, the imaging system 1400 may include an external I/F unit 1013 which can communicate with an external computer or the like.

Subsequently, an operation of the imaging system 1400 will be described hereinafter. If the barrier 1001 is opened, a main power supply, a power supply for the controlling system, and a power supply for the circuits of the imaging system such as the A/D converter 1006 and the like are sequentially turned on. After then, the total control/calculation unit 1009 opens the diaphragm 1003 to control an amount of exposure. Then, the signal output from the solid-state imaging apparatus 1004 is supplied to the A/D converter 1006 through the imaged signal processing circuit 1005. The A/D converter 1006 performs the A/D conversion process to the supplied signal and then outputs the obtained signal to the signal processing unit 1007. The signal processing unit 1007 processes the supplied signal and supplies the processed signal to the total control/calculation unit 1009. Then, the calculation for determining the amount of exposure is performed in the total control/calculation unit 1009. Subsequently, the total control/calculation unit 1009 controls the diaphragm on the basis of the determined amount of exposure.

Next, the total control/calculation unit 1009 extracts a high-frequency component from the signal which was output from the solid-state imaging apparatus 1004 and processed by the signal processing unit 1007, and then calculates a distance to the photographic subject on the basis of the extracted high-frequency component. After then, the total control/calculation unit 1009 judges whether or not the photographic subject is in focus, by driving the lens 1002. If it is judged that the photographic subject is not in focus, the total control/calculation unit 1009 calculates the distance by driving the lens 1002 again.

If it is judged and confirmed that the photographic subject is in focus, full exposure is started. Then, if the full exposure is completed, the imaged signal output from the solid-state imaging apparatus 1004 is corrected by the imaged signal processing circuit 1005, the corrected signal is A/D converted by the A/D converter 1006, and the A/D converted signal is processed by the signal processing unit 1007. Subsequently, such image data processed by the signal processing unit 1007 is stored in the memory unit 1010 by the total control/calculation unit 1009.

After then, the image data stored in the memory unit 1010 is recorded on the recording medium 1012 through the recording medium control I/F unit 1011 under the control of the total control/calculation unit 1009. Further, the image data is provided to the computer or the like through the external I/F unit 1013, and the provided image data can be processed.

Incidentally, the imaging system 1400 is suitable for, for example, a digital still camera, a video camera, or a camera module which is mounted on a terminal device such as a mobile phone or the like. Further, the solid-state imaging apparatus 1 can select either an operation of reading each pixel signal as an original signal or an operation of reading pixel signals after adding them.

According to the solid-state imaging apparatus which is constituted as described above and the imaging system which uses the relevant solid-state imaging apparatus, the four pixels which include the two G pixels adjacent in the oblique direction and the two R pixels or the two B pixels, in the same row or the same column, adjacent to one of the two G pixels adjacent in the oblique direction constitute each of the unit pixel groups 100 to 400, and the common amplifier constitution is established. For this reason, the two-pixel addition for the G pixels adjacent in the oblique direction and the same color two-pixel addition for the R pixels or the B pixels can be performed by the unit pixel groups 100 to 400 respectively, even if the addition unit such as a line memory or the like is not added. Further, since the two G pixels adjacent in the oblique direction are added together, spatial deviation in the image information of each color after the pixels were added can be suppressed as compared with the case where the pixels are added only in the vertical direction. Therefore, in case of reading the moving image, low-speed driving can be achieved, whereby it is possible to reduce the electric power consumption, and it is also possible to suppress deterioration of the low-resolution image.

Therefore, according to the present embodiment, it is possible to the solid-state imaging apparatus which can photograph the high-definition image and also can photograph at high quality the moving image of which the resolution is lower than that of the high-definition image, and to provide the imaging system which uses the relevant solid-state imaging apparatus.

The solid-state imaging apparatus in the present embodiment includes the pixel array unit 11. Further, the pixel array unit 11 includes the photoelectric conversion units 21*a* to 21*d* for photoelectrically converting the incident light into the charges corresponding to the amount of the incident light and then accumulating the converted charges, and the transfer transistors (transfer unit) 22*a* to 22*d* for transferring the charges photoelectrically converted by the corresponding photoelectric conversion units 21*a* to 21*d* respectively. Furthermore, the pixel array unit 11 includes the plural pixels which are two-dimensionally arranged. Besides, the color filters are arranged for the plural pixels in the form of the Bayer arrangement composed of the red filters, the green filters and the blue filters. The impurity diffused region (FD) 23 accumulates the charges respectively transferred from the photoelectric conversion units 21*a* to 21*d* through the corresponding transfer transistors 22*a* to 22*d*. The amplifying unit (amplifying transistor) 24 outputs the signals on the basis of the charges accumulated in the impurity diffused region 23. Further, the reset unit (reset transistor) 25 resets the potential of the impurity diffused region 23.

Each of the unit pixel groups 100 to 400 is constituted by the four pixels which include the two pixels which are mutually adjacent in the oblique direction and to which the green filters are arranged respectively, and the two pixels, in the same row or the same column, which are adjacent to one of the two pixels, to which the green filters are arranged respectively, and to which the red filters or the blue filters are arranged respectively. The impurity diffused region 23, the amplifying unit 24 and the reset unit 25 are commonly connected to the four pixels which constitute each of the unit pixel groups 100 to 400.

Each of the transfer transistors 22*a* to 22*d* is the MOS transistor. In FIG. 8, among the four pixels which constitute each of the unit pixel groups 100 to 400, a pair of the photoelectric conversion units 51*a* and 51*b* and a pair of the transfer units 52*a* and 52*b* of the two pixels to which the color filters of different colors are arranged respectively are arranged mirror symmetrically.

In FIG. 9, two pairs of the photoelectric conversion units 51*a* to 51*d* and two pairs of the transfer units 52*a* to 52*d* of the four pixels constituting each of the unit pixel groups 100 to 400 are arranged mirror symmetrically.

Further, the impurity diffused region 23 adds together the charges of the two pixels to which the color filters of the same color are arranged respectively.

The imaging system 1400 illustrated in FIG. 10 includes the solid-state imaging apparatus 1004, the optical system (lens) 1002 which performs the image formation of light to the solid-state imaging apparatus 1004, and the imaged signal processing circuit 1005 and the signal processing unit 1007 which respectively process the output signal from the solid-state imaging apparatus 1004.

According to the present embodiment, even if the addition unit such as the line memory or the like is not added, it is possible to add the charges of the two pixels to which the green filters are arranged in the unit pixel group and also add the charges of the two pixels to which the red filters or the blue filters are arranged in the unit pixel group. Further, by adding together the charges of the two pixels which are adjacent in the oblique direction and to which the green filters are arranged respectively, it is possible to suppress the spatial deviation in the image information of each color after the pixels were added, as compared with the case where the pixels are added together only in the vertical direction. For this reason, in case of reading the moving image, the low-speed driving can be achieved. Thus, it is possible to reduce the electric power consumption, and it is also possible to suppress deterioration of the low-resolution image. Moreover, it is possible to simplify the signal process to be performed in the signal processing circuit.

The above-described exemplary embodiments merely indicate examples of concretization in the case where the present invention is carried out. That is, it is to be understood that the technical scope of the present invention should not be limited to the disclosed exemplary embodiments. For example, it is possible to properly combine the respective embodiments mutually. In other words, it is possible to carry out the present invention in various forms without departing from the technical idea or the main features thereof.

This application claims priority from Japanese Patent Application No. 2008-306738 filed Dec. 1, 2008, which is hereby incorporated by reference herein.

What is claimed is:

1. A solid-state imaging apparatus comprising:
    plural pixels arranged two-dimensionally and each including:
        a photoelectric conversion unit for photoelectrically converting incident light into charges corresponding to an amount of the incident light and accumulating the converted charges, and
        a transfer unit for transferring the charges photoelectrically converted by the photoelectric conversion unit; and
    an amplifier for outputting signals based on the charges transferred from the photoelectric conversion unit through the transfer unit,
    wherein no more than four pixels, which include a first two pixels and a second two pixels, constitute a unit pixel group, the first two pixels being adjacent in an oblique direction, and the second two pixels being in one of a same row and a same column, and being immediately adjacent on both sides of one of the first two pixels in the same row or the same column, and the amplifier is commonly connected to no more than one unit pixel group.

2. The solid-state imaging apparatus according to claim 1, wherein
    color filters, which include red filters, green filters, and blue filters and are arranged in the form of a Bayer arrangement, are provided in regard to the plural pixels, and
    the green filters are arranged corresponding to the first two pixels adjacent in the oblique direction and the red filters or the blue filters are arranged corresponding to the second two pixels, in the same row or the same column, adjacent to one of the first two pixels adjacent in the oblique direction.

3. The solid-state imaging apparatus according to claim 2, wherein
    each transfer unit includes an MOS (metal-oxide semiconductor) transistor, and
    a pair of photoelectric conversion units and a pair of transfer units corresponding to two pixels from among the four pixels constituting the unit pixel group, to which the color filters of different colors are respectively arranged, mirror symmetrically.

4. The solid-state imaging apparatus according to claim 2, further comprising:
    an impurity diffused region which accumulates the charges transferred from the photoelectric conversion units through the transfer units; and
    a reset unit, which resets potential of the impurity diffused region,
    wherein the impurity diffused region adds together the charges of the two pixels to which same-color filters, among the color filters, are correspondingly arranged.

5. The solid-state imaging apparatus described in claim 1, wherein the apparatus is incorporated in an imaging system that includes:
    a signal processing circuit, which processes an output signal output from the solid-state imaging apparatus.

6. A solid-state imaging apparatus, which is equipped with plural pixels arranged two-dimensionally, each pixel including a photoelectric conversion unit and a transfer unit for transferring charges generated in the photoelectric conversion unit, and a color filter in which filters of a first color, filters of a second color, and filters of a third color are arranged two-dimensionally corresponding to the plural pixels,
    wherein, in the color filter, the filters of the first color and the filters of the second color are alternately arranged in a certain direction, the filters of the first color are continuously arranged in an oblique direction to the certain direction, and the filters of the first color and the filters of the third color are alternately arranged in another direction perpendicular to the certain direction,
    the plural pixels include a first unit pixel group and a second unit pixel group,
    the first unit pixel group includes a first pixel and a second pixel, which are mutually adjacent to each other and corresponding to which the filters of the first color are arranged, a third pixel and a fourth pixel each of which is adjacent to the second pixel and corresponding to which the filters of the second color are arranged, and a first amplifier which outputs signals based on charges of a first node commonly connected to the transfer units of the first pixel, the second pixel, the third pixel and the fourth pixel,
    the second unit pixel group includes a fifth pixel and a sixth pixel, which are mutually adjacent to each other and arranged corresponding to an arrangement of the filters of the first color, a seventh pixel and an eighth pixel each of which is adjacent to the sixth pixel and arranged corresponding to an arrangement of the filters of the third color, and a second amplifier, which outputs signals based on charges of a second node commonly connected to the transfer units of the fifth pixel, the sixth pixel, the seventh pixel, and the eighth pixel, and the first unit pixel group and the second unit pixel group are arranged so that the second pixel and the sixth pixel are mutually adjacent to each other in the oblique direction, wherein the first unit pixel group does not include a pixel corresponding to which the filters of the third color are arranged, and the second unit pixel group does not include a pixel corresponding to which the filters of the second color are arranged.

7. The solid-state imaging apparatus according to claim 6, wherein the third pixel is adjacent to the first pixel and the second pixel, and the first node commonly connected to the transfer units of the first pixel, the second pixel, the third pixel, and the fourth pixel includes an impurity diffused region shared by the transfer unit of the first pixel and the transfer unit of the third pixel.

8. The solid-state imaging apparatus according to claim 6, wherein the fourth pixel is adjacent to the second pixel, and the first node commonly connected to the transfer units of the first pixel, the second pixel, the third pixel and the fourth pixel includes an impurity diffused region shared by the transfer unit of the second pixel and the transfer unit of the fourth pixel.

9. The solid-state imaging apparatus according to claim 6, wherein
the first unit pixel group, which includes the first pixel, the second pixel, the third pixel, and the fourth pixel, includes a reset unit for resetting a potential of the first node commonly connected to the transfer units of the first pixel, the second pixel, the third pixel, and the fourth pixel, and
the second unit pixel group, which includes the fifth pixel, the sixth pixel, the seventh pixel, and the eighth pixel, includes another reset unit, other than the reset unit of the first unit pixel group including the first pixel, the second pixel, the third pixel and the fourth pixel, for resetting a potential of the second node commonly connected to the transfer units of the fifth pixel, the sixth pixel, the seventh pixel and the eighth pixel.

10. The solid-state imaging apparatus according to claim 6, wherein the first node includes a first impurity diffused region shared by the transfer unit of the first pixel and the transfer unit of the third pixel, and a second impurity diffused region shared by the transfer unit of the second pixel and the transfer unit of the fourth pixel.

11. The solid-state imaging apparatus according to claim 10, wherein
a transfer transistor is included in each of the transfer units of the plural pixels, and
the first impurity diffused region is a drain of the transfer transistor of the first pixel and a drain of the transfer transistor of the third pixel, and the second impurity diffused region is a drain of the transfer transistor of the second pixel and a drain of the transfer transistor of the fourth pixel.

12. The solid-state imaging apparatus according to claim 6, wherein a direction in which the first pixel and the second pixel are aligned is perpendicular to a direction in which the sixth pixel and the fifth pixel are aligned.

13. The solid-state imaging apparatus according to claim 6, wherein the first color includes green, the second color includes red, and the third color includes blue.

14. The solid-state imaging apparatus described in claim 6, wherein the apparatus is incorporated in an imaging system that includes:
a signal processing circuit, which processes an output signal from the solid-state imaging apparatus.

15. The solid-state imaging apparatus according to claim 14, wherein at least one of charges of the first pixel and the second pixel, and charges of the third pixel and the fourth pixel can be added at the first node, and at least one of charges of the fifth pixel and the sixth pixel, and charges of the seventh pixel and the eighth pixel can be added at the second node.

16. A solid-state imaging apparatus comprising:
plural pixels arranged two-dimensionally and each including:
a photoelectric conversion unit for photoelectrically converting incident light into charges corresponding to an amount of the incident light and accumulating the converted charges, and
a transfer unit for transferring the charges photoelectrically converted by the photoelectric conversion unit; and
an amplifier, which outputs signals based on the charges transferred from the photoelectric conversion unit through the transfer unit,
wherein no more than four pixels, which include a first two pixels and a second two pixels, constitute a unit pixel group, the first two pixels being adjacent in a first direction, and the second two pixels being in a second direction other than the first direction, and being immediately adjacent on both sides of one of the first two pixels in the second direction, and
the amplifier is commonly connected to no more than one unit pixel group.

17. The solid-state imaging apparatus according to claim 16, wherein the second direction is oblique to the first direction.

18. The solid-state imaging apparatus according to claim 16, wherein
color filters, which include red filters, green filters, and blue filters, and are arranged in the form of a Bayer arrangement, are provided in regard to the plural pixels, and
the green filters are arranged corresponding to the first two pixels adjacent in the first direction, and the red filters or the blue filters are arranged corresponding to the second two pixels, in the second direction, adjacent to one of the first two pixels adjacent in the first direction.

19. The solid-state imaging apparatus according to claim 16, further comprising
an impurity diffused region, which accumulates the charges transferred from the photoelectric conversion units through the transfer units; and
a reset unit, which resets a potential of the impurity diffused region,
wherein the impurity diffused region adds together the charges of the two pixels to which same-color filters, among the color filters, are correspondingly arranged.

20. The solid-state imaging apparatus according to claim 16, wherein
a transfer transistor is included in each transfer unit of the four pixels,
a first impurity diffused region doubles as a drain of the transfer transistor of one of the first two pixels and a drain of the transfer transistor of one of the second two pixels, and
a second impurity diffused region doubles as a drain of the transfer transistor of another one of the first two pixels and a drain of the transfer transistor of another one of the second two pixels.

21. The solid-state imaging apparatus described in claim 16, wherein the apparatus is incorporated in an imaging system that includes:
a signal processing circuit, which processes an output signal output from the solid-state imaging apparatus.

* * * * *